US010976562B2

(12) United States Patent
Gorelik et al.

(10) Patent No.: US 10,976,562 B2
(45) Date of Patent: Apr. 13, 2021

(54) NANO-STRUCTURED NON-POLARIZING BEAMSPLITTER

(71) Applicant: KLA-Tencor Corporation, Milpitas, CA (US)

(72) Inventors: Dmitry Gorelik, Migdal Ha'emek (IL); Andrew V. Hill, Berkley, CA (US); Ohad Bachar, Timrat (IL); Amnon Manassen, Haifa (IL); Daria Negri, Nesher (IL)

(73) Assignee: KLA Corporation, Milpitas, CA (US)

( * ) Notice: Subject to any disclaimer, the term of this patent is extended or adjusted under 35 U.S.C. 154(b) by 181 days.

(21) Appl. No.: 16/138,092

(22) Filed: Sep. 21, 2018

(65) Prior Publication Data

US 2019/0107727 A1 Apr. 11, 2019

Related U.S. Application Data

(60) Provisional application No. 62/570,423, filed on Oct. 10, 2017.

(51) Int. Cl.
| | | |
|---|---|---|
| *G02B 27/14* | (2006.01) | |
| *G02B 27/10* | (2006.01) | |
| *G02B 27/09* | (2006.01) | |

(52) U.S. Cl.
CPC ........ *G02B 27/147* (2013.01); *G02B 27/0955* (2013.01); *G02B 27/1006* (2013.01);
(Continued)

(58) Field of Classification Search
CPC .... G02B 27/14; G02B 27/143; G02B 27/147; G02B 27/4233; G02B 21/006; G02B 27/1006
(Continued)

(56) References Cited

U.S. PATENT DOCUMENTS 5,243,465 A * 9/1993 Fein ................. G01J 3/02
359/350
5,880,465 A * 3/1999 Boettner ............ G02B 21/0028
250/201.3
(Continued)

FOREIGN PATENT DOCUMENTS

CN        1975479 A      6/2007
CN      102053380 A      5/2011
(Continued)

OTHER PUBLICATIONS

Weiner, J. "The Physics of Light Transmission through Subwavelength Apertures and Aperture Arrays." Reports on Progress in Physics, vol. 72, No. 6, May 27, 2009, pp. 1-19., doi:10.1088/0034-4885/72/6/064401 (Year: 2009).*
(Continued)

*Primary Examiner* — Zachary W Wilkes
(74) *Attorney, Agent, or Firm* — Suiter Swantz pc llo

(57) ABSTRACT

A beamsplitter includes a substrate formed from a material transparent to wavelengths of light at least above a selected cutoff wavelength and reflective structures distributed across a surface of the substrate. The reflective structures split incident light having wavelengths above the selected cutoff wavelength into a reflected beam formed from portions of the incident light reflected from the reflective structures and a transmitted beam formed from portions of the incident light transmitted through the substrate. A splitting ratio of a power of the reflected beam to a power of the transmitted beam is based on a ratio of surface area of the reflective surfaces to an area of the incident light on the substrate. Separation distances between neighboring reflective structures are smaller than the cutoff wavelength such that diffracted power of the incident light having wavelengths above the selected cutoff wavelength is maintained below a selected tolerance.

20 Claims, 6 Drawing Sheets

(52) U.S. Cl.
CPC ........... *G02B 27/14* (2013.01); *G02B 27/142* (2013.01); *G02B 27/143* (2013.01)

(58) Field of Classification Search
USPC .................................. 359/629, 634, 639, 638
See application file for complete search history.

(56) References Cited

U.S. PATENT DOCUMENTS

| | | | |
|---|---|---|---|
| 6,234,634 B1* | 5/2001 | Hansen ................ | G02B 27/283 353/20 |
| 6,426,837 B1* | 7/2002 | Clark .................. | G02B 5/1809 356/71 |
| 7,376,298 B2 | 5/2008 | Schilling | |
| 10,649,209 B2* | 5/2020 | Leighton ............. | G02B 27/147 |
| 2003/0026001 A1 | 2/2003 | Heller et al. | |
| 2005/0201656 A1 | 9/2005 | Nikolov et al. | |
| 2006/0039006 A1 | 2/2006 | Van Der Pasch | |
| 2006/0158708 A1 | 7/2006 | Hocheng et al. | |
| 2006/0164654 A1 | 7/2006 | Eah et al. | |

FOREIGN PATENT DOCUMENTS

| | | |
|---|---|---|
| CN | 104614796 A | 5/2015 |
| CN | 104730621 A | 6/2015 |
| CN | 106624354 A | 5/2017 |
| EP | 2492739 A1 | 8/2012 |
| KR | 1020010043706 A | 5/2001 |
| KR | 100684340 B1 | 2/2007 |
| KR | 20120088749 A | 8/2012 |

OTHER PUBLICATIONS

Ebbesen, T., Lezec, H., Ghaemi, H. et al. Extraordinary optical transmission through sub-wavelength hole arrays. Nature 391, 667-669 (1998). https://doi.org/10.1038/35570 (Year: 1998).*

ThorLabs. "Polka Dot Beamsplitters." Polka Dot Beamsplitters, Mar. 11, 2016, www.thorlabs.com/newgrouppage9.cfm?objectgroup_ID=1110 (Year: 2016).*

Ghaemi, H. F., et al. "Surface Plasmons Enhance Optical Transmission through Subwavelength Holes." Physical Review B, vol. 58, No. 11, 1998, pp. 6779-6782., doi:10.1103/physrevb.58.6779. (Year: 1998).*

Garcia-Vidal, F. J., et al. "Light Passing through Subwavelength Apertures." Reviews of Modern Physics, vol. 82, No. 1, 2010, pp. 729-787., doi:10.1103/revmodphys.82.729. (Year: 2010).*

Emilie Sakat, et al., "Free-standing guided-mode resonance bandpass filters: from 1D to 2D structures," Opt. Express 20, 13082-13090 (2012) (Year: 2012).*

Pacifici, D., et al. "Quantitative Determination of Optical Transmission through Subwavelength Slit Arrays in Ag Films: Role of Surface Wave Interference and Local Coupling between Adjacent Slits." Physical Review B, vol. 77, No. 11, 2008, doi:10.1103/physrevb.77.115411. (Year: 2008).*

Yasin Ekinci, et al., "Extraordinary optical transmission in the ultraviolet region through aluminum hole arrays," Opt. Lett. 32, 172-174 (2007) (Year: 2007).*

John Weiner, "The electromagnetics of light transmission through subwavelength slits in metallic films," Opt. Express 19, 16139-16153 (2011) (Year: 2011).*

Metals and Materials International, "Fabrication and characterization of functionalized wet-chemical silver coated films on glass for optical systems" Abstract, Oct. 2009, 15:825, 4 pages, https://link.springer.com/article/10.1007/s12540-009-0825-2, First Online Oct. 26, 2009.

Thorlabs, "Non-Polarizing Cube Beamsplitters (400-700nm)", https://www.thorlabs.com/newgrouppage9.cfm?objectgroup_id=754, 3 pages, Accessed Oct. 30, 2017.

Thorlabs, "UV Fused Silica Broadband Plate Beamsplitters (Coatings: 250-450nm)", https://www.thorlabs.com/newgrouppage9.cfm?objectgroup_id=4806, 2 pages, Accessed Oct. 30, 2017.

International Search Report dated Mar. 26, 2019 for PCT/US2018/054490.

* cited by examiner

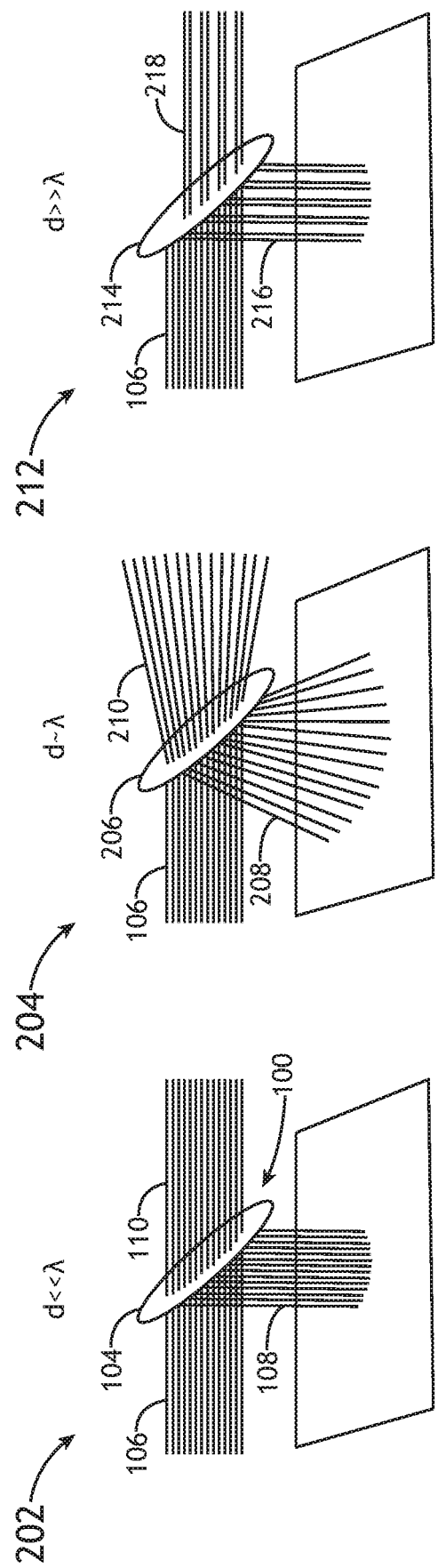

400

402 — DIRECTING LIGHT HAVING WAVELENGTHS ABOVE A SELECTED CUTOFF WAVELENGTH TO A SUBSTRATE FORMED FROM A MATERIAL TRANSPARENT TO WAVELENGTHS OF LIGHT AT LEAST ABOVE THE SELECTED CUTOFF WAVELENGTH, WHERE THE SUBSTRATE INCLUDES REFLECTIVE FEATURES DISTRIBUTED ACROSS A SURFACE OF THE SUBSTRATE

404 — REFLECTING A PORTION OF THE INCIDENT LIGHT FROM THE PLURALITY OF REFLECTIVE FEATURES

406 — TRANSMITTING A PORTION OF THE INCIDENT LIGHT THROUGH THE SUBSTRATE, WHERE A SPLITTING RATIO OF A POWER OF THE REFLECTED BEAM TO A POWER OF THE TRANSMITTED BEAM IS BASED ON A RATIO OF SURFACE AREA OF THE PLANAR SURFACES TO AN AREA OF THE SUBSTRATE NOT COVERED BY THE REFLECTIVE STRUCTURES, AND SEPARATION DISTANCES BETWEEN THE REFLECTIVE FEATURES ARE SMALLER THAN THE CUTOFF WAVELENGTH

FIG.4

NANO-STRUCTURED NON-POLARIZING BEAMSPLITTER

CROSS-REFERENCE TO RELATED APPLICATION

The present application claims the benefit under 35 U.S.C. § 119(e) of U.S. Provisional Application Ser. No. 62/570,423, filed Oct. 10, 2017, entitled NANO-STRUCTURED COATING FOR BROAD BAND NON POLARIZING BEAM-SPLITTERS, naming Dmitry Gorelik, Andrew Hill, Ohad Bachar, Amnon Manassen, and Daria Negri as inventors, which is incorporated herein by reference in the entirety.

TECHNICAL FIELD

The present disclosure relates generally to optical beamsplitters and, more particularly, to nano-structured beamsplitters.

BACKGROUND

Beamsplitters suitable for splitting optical light beams are utilized in many optical systems. For example, in the context of optical metrology systems, beamsplitters are typically utilized to combine illumination and collection pathways for use with a common objective lens. However, designing beamsplitters for broadband applications in which the spectrum of light beams of interest covers a wide range of wavelengths presents multiple challenges. For example, simultaneously providing a selected beamsplitting ratio (e.g., a fraction of reflected light to transmitted light) along with a high degree of spatial uniformity, low absorption, and low diffraction is increasingly challenging as the required spectral width increases. It is therefore desirable to provide systems and methods to cure the deficiencies described above.

SUMMARY

A beamsplitter is disclosed in accordance with one or more illustrative embodiments of the present disclosure. In one illustrative embodiment, the beamsplitter includes a substrate formed from a material transparent to wavelengths of light at least above a selected cutoff wavelength. In another illustrative embodiment, the beamsplitter includes reflective structures distributed across a surface of the substrate, where the reflective structures split incident light having wavelengths above the selected cutoff wavelength into a reflected beam formed from portions of the incident light reflected from the reflective structures and a transmitted beam formed from portions of the incident light transmitted through the substrate. In another illustrative embodiment, a splitting ratio of a power of the reflected beam to a power of the transmitted beam is based on a ratio of surface area of the reflective surfaces to an area of the substrate uncovered by reflective surfaces. In another illustrative embodiment, separation distances between neighboring reflective structures are smaller than the cutoff wavelength such that the power of non-zero diffraction orders of the incident light having wavelengths above the selected cutoff wavelength is maintained below a selected tolerance.

A metrology system is disclosed in accordance with one or more illustrative embodiments of the present disclosure. In one illustrative embodiment, the system includes an illumination source configured to generate an illumination beam having wavelengths above a selected cutoff wavelength. In another illustrative embodiment, the system includes an objective lens. In another illustrative embodiment, the system includes a detector. In another illustrative embodiment, the system includes a beamsplitter. In another illustrative embodiment, the beamsplitter splits the illumination beam into a first illumination beam and a second illumination beam. In another illustrative embodiment, the objective lens directs the first illumination beam to a sample. In another illustrative embodiment, the objective lens collects radiation emanating from the sample in response to the first illumination beam and splits the radiation emanating from the sample from the objective lens into a first detected beam and a second detected beam, where the detector receives the first detected beam. In another illustrative embodiment, the beamsplitter includes a substrate formed from a material transparent to wavelengths of light at least above the selected cutoff wavelength. In another illustrative embodiment, the beamsplitter includes reflective structures distributed across a surface of the substrate configured to split incident light having wavelengths above the selected cutoff wavelength into a reflected beam formed from portions of the incident light reflected and a transmitted beam formed from portions of the incident light transmitted through the substrate. In another illustrative embodiment, a splitting ratio of a power of the reflected beam to a power of the transmitted beam is based on a ratio of surface area of the reflective surfaces to an area of the substrate uncovered by the reflective structures. In another illustrative embodiment, separation distances between neighboring reflective structures are smaller than the cutoff wavelength such that power of non-zero diffracted orders of the incident light having wavelengths above the selected cutoff wavelength are maintained below a selected tolerance.

A method for splitting light is disclosed in accordance with one or more illustrative embodiments of the present disclosure. In one illustrative embodiment, the method includes directing light having wavelengths above a selected cutoff wavelength to a surface of a substrate formed from a material transparent to wavelengths of light at least above the selected cutoff wavelength, where the substrate includes reflective structures distributed across the surface of the substrate. In another illustrative embodiment, the method includes reflecting a portion of the incident light from the reflective structures. In another illustrative embodiment, the method includes transmitting a portion of the incident light through the surface of the substrate. In another illustrative embodiment, a splitting ratio of a power of the reflected beam to a power of the transmitted beam is based on a ratio of surface area of the reflective surfaces to an area of the substrate not covered by the reflective structures. In another illustrative embodiment, separation distances between neighboring reflective structures are smaller than the cutoff wavelength such that the power of non-zero diffracted orders of the incident light having wavelengths above the selected cutoff wavelength are maintained below a selected tolerance.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which:

FIG. 2A is a perspective view of a structured surface splitting an incident beam into a reflected beam and a transmitted beam having structures separated by a maximum distance (d) satisfying the condition d<<λ for all wavelengths (λ) of the incident beam, in accordance with one or more embodiments of the present disclosure.

FIG. 2B is a perspective view of a structured surface splitting an incident beam into a reflected beam and a transmitted beam having reflective structures separated by a maximum distance (d) satisfying the condition d~λ for all wavelengths (λ) of the incident beam, in accordance with one or more embodiments of the present disclosure.

FIG. 2C is a perspective view of a structured surface splitting an incident beam into a reflected beam and a transmitted beam having reflective structures separated by a maximum distance (d) satisfying the condition d>>λ for all wavelengths (λ) of the incident beam, in accordance with one or more embodiments of the present disclosure.

FIG. 4 is a flow diagram illustrating steps performed in a method for splitting light, in accordance with one or more embodiments of the present disclosure.

DETAILED DESCRIPTION

Figure 1B:
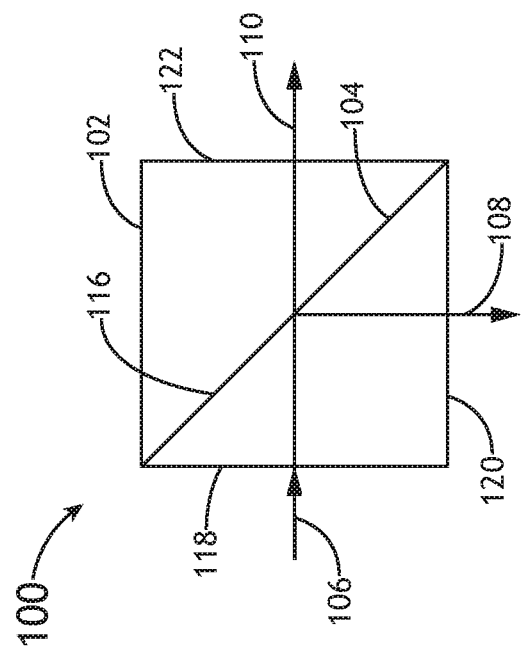
FIG. 1B is a conceptual view of a nanostructured beamsplitter configured as a cubic beamsplitter, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to a nanostructured non-polarizing beamsplitter suitable for broadband applications. In one embodiment, the nanostructured beamsplitter includes an arrangement of reflective structures on an optically transparent substrate, where the separation distances and/or the sizes of the reflective structures are substantially smaller than the lowest wavelength of a spectrum of interest. Incident light within the spectrum of interest may thus be split between reflected and transmitted beams according to the area ratio of the reflective structures on the surface. In this regard, the nanostructured beamsplitter may operate as an area-division beamsplitter. Further, diffraction losses associated with diffraction of incident light within the spectrum of interest on the reflective structures are nominal.

It is recognized herein that a beamsplitter including a non-structured surface (e.g., a metallic film, a dielectric film, a film stack, or the like) on a substrate may operate as a wavefront division beamsplitter and may typically provide high spatial uniformity suitable for any beam size, which may be suitable for diffraction-limited systems. However, non-structured surfaces may not be well-suited for broadband applications. For example, a metallic film beamsplitter may provide broadband performance due to a wideband reflectivity of many metals, but may suffer from high absorption losses in the film for non-reflected wavelengths. By way of another example, dielectric film beamsplitters may provide limited absorption losses, but may only be suitable for limited wavelength ranges. Accordingly, embodiments of the present disclosure are directed to a beamsplitter including patterned reflective structures on a substrate, where the size and distribution of the reflective structures are selected to simultaneously provide broadband performance and high spatial uniformity for reflected and transmitted beams.

The diffraction of light by a surface including an arrangement of reflective structures on a transparent substrate may be characterized by the diffraction equation:

$$n\lambda = d \cdot (\sin \alpha + \sin \beta), \qquad (1)$$

where d is the separation between structures, λ is the wavelength of light, n is the order of diffraction (e.g., spectral order), α is the incident angle of light on the structured surface, and β is the diffraction angle. Further, Eq. (1) may apply for both structures periodically distributed with a pitch of d or for more complex arrangements of structures having a spatial frequency component of d. Accordingly, the diffraction behavior of light may depend on the relationship between the wavelength of light (λ) and the separation between structures (d).

Additional embodiments of the present disclosure are directed to a nanostructured beamsplitter including reflective structures distributed with d<<λ with respect to Eq. (1). Accordingly, Eq. (1) simplifies such that β=−α for both reflected and transmitted light. In this regard, incident light is split into a single reflected beam and a single transmitted beam, where the ratio of reflected light to transmitted light depends on the ratio of the structured area to unstructured (e.g., uncoated) area as well as the reflectance of the structures. Further, the nanostructured beamsplitter may provide broadband performance based on broadband reflectivity of reflective structures.

It is recognized herein that a nanostructured beamsplitter having structures satisfying the condition of d<<λ may additionally provide high spatial uniformity for optical beams of any size. In this regard, the nanostructured beamsplitter may be optically indistinguishable from a wavefront beamsplitter and may thus be suitable for any application including, but not limited to, diffraction-limited systems.

It is further recognized herein that a nanostructured beamsplitter having structures satisfying the condition of d<<λ may overcome limitations of surfaces not satisfying the condition. For example, in the case where d>>λ, Eq. (1) also simplifies such that β=−α for both reflected and transmitted light such that incident light is split into a single reflected beam and a single transmitted beam. However, the large size and/or separation of the structures may result in spatial nonuniformities in the reflected and/or transmitted beams such that the surface may not be suitable for small beams (e.g., beams on the order of d) and/or diffraction-limited systems. By way of another example, in the case where d~λ, Eq. (1) has multiple solutions associated with multiple orders of diffraction generated by the structures. Accordingly, such surfaces may suffer from significant diffraction losses and are typically not suitable for beamsplitting applications.

Referring now to FIGS. 1 through 4, a nanostructured beamsplitter is described in greater detail.

Figure 1A:
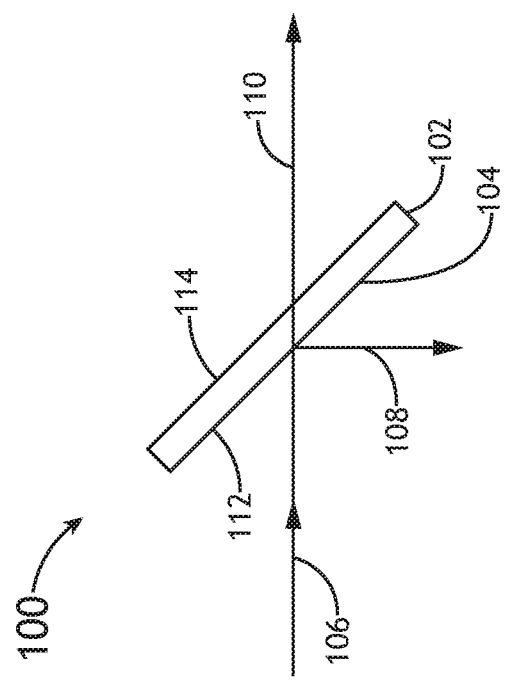
FIG. 1A is a conceptual view of a nanostructured beamsplitter configured as a plate beamsplitter, in accordance with one or more embodiments of the present disclosure.

FIGS. 1A and 1B are conceptual views of a nanostructured beamsplitter 100 configured as a plate beamsplitter and a cubic beamsplitter, respectively, in accordance with one or more embodiments of the present disclosure. In one embodiment, the nanostructured beamsplitter 100 includes a substrate 102 transparent to wavelengths of interest. The substrate 102 may further include a structured surface 104 for splitting an incident beam 106 of light into a reflected beam 108 and a transmitted beam 110. The structured surface 104 may be located on any face of the substrate 102.

In one embodiment, as illustrated in FIG. 1A, the nanostructured beamsplitter 100 is formed as a plate beamsplitter including two parallel faces: an input face 112 and an output face 114. For example, as illustrated in FIG. 1A, the structured surface 104 may be located on an input face 112. In this regard, the reflected beam 108 may include portions of the incident beam 106 reflected by the structured surface 104 and the transmitted beam 110 may include portions of the incident beam 106 transmitted through the structured surface 104 that further propagate through the substrate 102 and exit through an output face 114. By way of another example, though not shown, the structured surface 104 may be located on the output face 114. In this regard, the incident beam 106 may enter the substrate 102 through the input face 112 and be split into the reflected beam 108 and the transmitted beam 110 upon interaction with the structured surface 104 such that the transmitted beam 110 exits the substrate 102 at the output face 114 and the reflected beam 108 propagates back through the substrate 102 and the input face 112.

In another embodiment, as illustrated in FIG. 1B, the nanostructured beamsplitter 100 is formed as a cubic beamsplitter. In this regard, the structured surface 104 may be formed as an interior face 116. Accordingly, the incident beam 106 may enter an input face 118, the reflected beam 108 may exit through a first output face 120 and the transmitted beam 110 may exit through a second output face 122. Further, it is recognized herein the reflected beam 108 and the transmitted beam 110 may propagate through the distance in the substrate 102 in the cubic beamsplitter arrangement of FIG. 1B.

The substrate 102 may be formed from any material transparent to wavelengths of interest such as, but not limited to, a glass, a crystal, or a ceramic material. In this regard, wavelengths of interest may not be absorbed during propagation through the substrate 102. In one embodiment, a nanostructured beamsplitter 100 configured for visible wavelengths of interest includes a substrate 102 formed from a material transparent to the visible wavelengths of light such as, but limited to, fused silica, quartz, sapphire, or borosilicate glass. In another embodiment, a nanostructured beamsplitter 100 configured for wavelengths of interest including ultraviolet (UV) wavelengths or vacuum ultraviolet (VUV) wavelengths includes a substrate 102 formed from a material transparent to the UV or VUV wavelengths of light such as, but limited to, magnesium fluoride, lithium fluoride, SUPRASIL 1, SUPRASIL 2, SUPRASIL 300, SUPRASIL 310, HERALUX PLUS, or HERALUX-VUV. Further, it is to be understood that the above materials and wavelength ranges are provided solely for illustrative purposes and should not be interpreted as limiting. The substrate 102 may be formed from any material suitable for providing transparency (e.g., nominal absorption) for any desired range of wavelengths including, but not limited to, extreme ultraviolet (EUV) wavelengths, deep ultraviolet (DUV) wavelengths, VUV wavelengths, UV wavelengths, visible wavelengths, or infrared (IR) wavelengths.

Figure 1D:
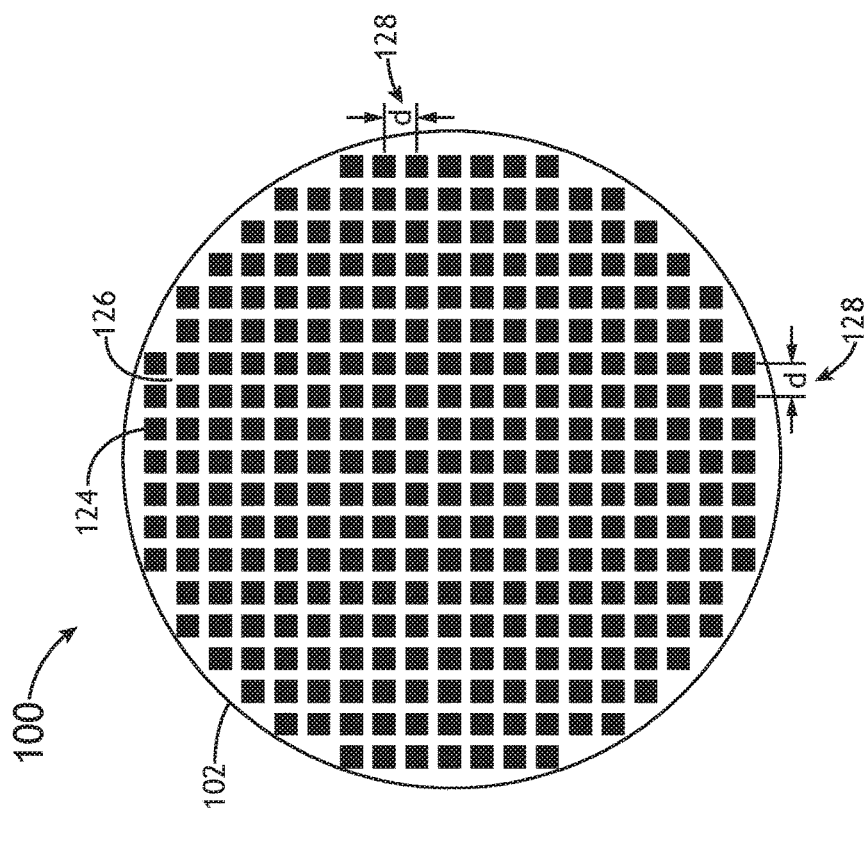
FIG. 1D is a top view of a structured surface formed as a circle, in accordance with one or more embodiments of the present disclosure.
Figure 1C:
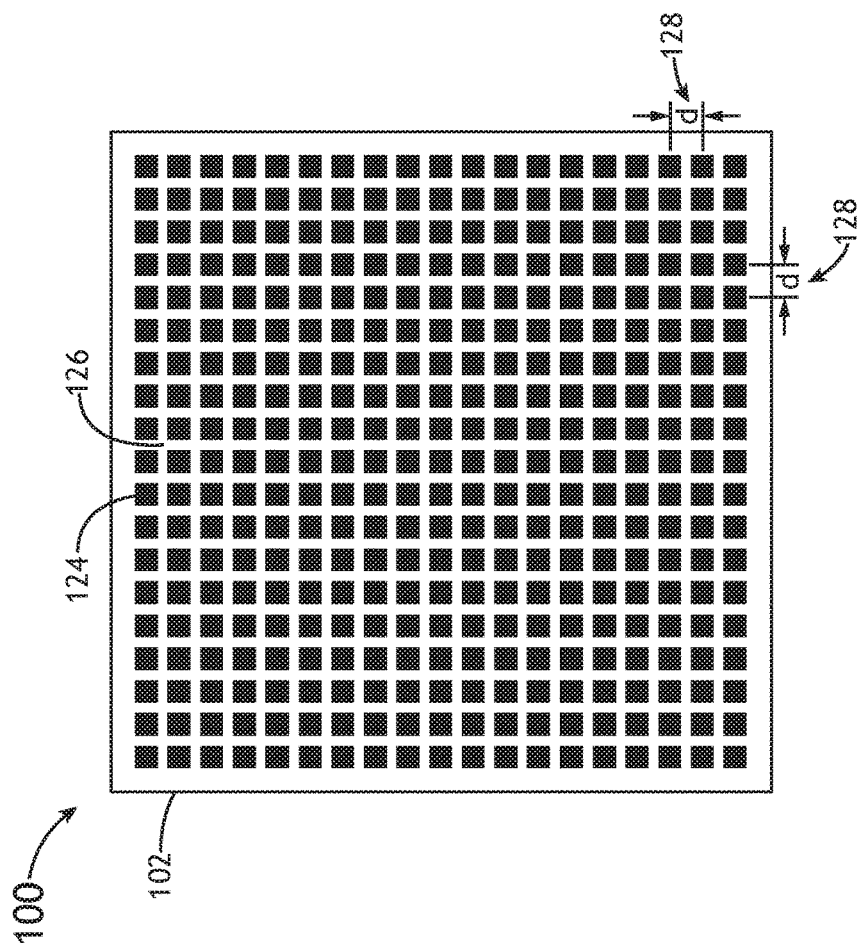
FIG. 1C is a top view of a structured surface formed as a square, in accordance with one or more embodiments of the present disclosure.

The structured surface 104 may be formed in any shape. FIGS. 1C and 1D are top views of a structured surface 104 formed as a square and a circle, respectively, in accordance with one or more embodiments of the present disclosure.

In one embodiment, the structured surface 104 includes a distribution of reflective structures 124 satisfying the condition of d<<λ with respect to Eq. (1). The reflected beam 108 may thus include a portion of the incident beam 106 reflected by the reflective structures 124 and the transmitted beam 110 may include a portion of the incident beam 106 transmitted through the uncovered surface 126 (e.g., areas of the structured surface 104 not covered by the reflective structures 124). Further, to the extent that the reflective structures 124 satisfy the condition of d<<λ (e.g., for wavelengths of interest), the structures do not appreciably diffract the incident beam 106 such that the incident beam 106 may not be degraded by diffraction losses.

The reflective structures 124 may be distributed in any pattern satisfying the condition of d<<λ with respect to Eq. (1). In one embodiment, as illustrated in FIGS. 1C and 1D, the reflective structures 124 are distributed in a two-dimensional periodic array (e.g., a lattice pattern) having a pitch 128 equal to d in one or more directions. For example, the reflective structures 124 may be distributed in any type of lattice pattern such as, but not limited to, a rectangular lattice pattern (e.g., as illustrated in FIGS. 1C and 1D), a hexagonal lattice pattern, a two-dimensional oblique lattice pattern, or a two-dimensional equilateral triangle lattice pattern. Accordingly, the beamsplitting ratio may depend on the dimensions of the structures with respect to the pitch 128. In another embodiment, though not shown, the reflective structures 124 are distributed in a nonuniform distribution satisfying the condition of d<<λ with respect to Eq. (1). In this regard, the sizes and/or separations between structures may vary, but are constrained such that the condition of d<<λ with respect to Eq. (1) is satisfied across the structure. For example, the reflective structures 124 may be distributed in a random or pseudo-random distribution.

FIGS. 2A through 2C illustrate that the diffraction behavior of structured surfaces may vary based on the pitch (e.g., pitch 128) relative to the wavelength of incident light (λ). FIG. 2A is a perspective view 202 of a structured surface 104 (e.g., a part of a nanostructured beamsplitter 100) splitting an incident beam 106 into a reflected beam 108 and a transmitted beam 110 having structures (e.g., reflective structures 124, or the like; not shown) separated by a maximum distance (d) satisfying the condition d<<λ for all wavelengths (λ) of the incident beam 106, in accordance with one or more embodiments of the present disclosure. As described previously herein, provided that the condition d<<λ is satisfied, Eq. (1) simplifies such that β=−α for both reflected and transmitted light. In this regard, 0-order diffraction (or specular reflection), which is wavelength-independent, effectively dominates for all wavelengths such that the divergence of the reflected beam 108 and the transmitted beam 110 are unchanged relative to the incident beam 106.

Accordingly, the beam-splitting ratio is based on the relative area of the reflective structures 124 that reflect portions of the incident beam 106 to the uncovered surface 126 that transmits portions of the incident beam 106 (e.g., see FIGS. 1C and 1D). For example, as illustrated in FIG. 2A, a collimated incident beam 106 is split into a collimated reflected beam 108 and a collimated transmitted beam 110. Further, the small structures relative to the wavelength provide spatially uniform splitting into the reflected beam 108 and the transmitted beam 110.

In contrast, FIGS. 2B and 2C illustrate undesirable impacts associated with beamsplitting by structured surfaces not satisfying the condition $d \ll \lambda$.

FIG. 2B is a perspective view 204 of a structured surface 206 splitting an incident beam 106 into a reflected beam 208 and a transmitted beam 210 having reflective structures (not shown) separated by a maximum distance (d) satisfying the condition $d \sim \lambda$ for all wavelengths ($\lambda$) of the incident beam 106, in accordance with one or more embodiments of the present disclosure. As described previously herein, provided that the condition $d \sim \lambda$ is satisfied, Eq. (1) describes wavelength-dependent diffraction. Accordingly, as illustrated in FIG. 2B, different wavelengths of the broadband incident beam 106 will be diffracted by different angles ($\beta$) in both the reflected beam 208 and the transmitted beam 210, which results in undesirable spatial dispersion in the reflected beam 208 and the transmitted beam 210.

FIG. 2C is a perspective view 212 of a structured surface 214 splitting an incident beam 106 into a reflected beam 216 and a transmitted beam 218 having reflective structures (not shown) separated by a maximum distance (d) satisfying the condition $d \gg \lambda$ for all wavelengths ($\lambda$) of the incident beam 106, in accordance with one or more embodiments of the present disclosure. As described previously herein, provided that the condition $d \gg \lambda$ is satisfied, Eq. (1) simplifies such that $\beta = -\alpha$ for both reflected and transmitted light. In this regard, 0-order diffraction, which is wavelength-independent, effectively dominates for all wavelengths such that the divergence of the reflected beam 216 and the transmitted beam 218 are unchanged relative to the incident beam 106. However, as illustrated in FIG. 2C, the large size of reflective structures relative to the wavelength distort the reflected beam 216 and the transmitted beam 218 such that the reflected beam 216 and the transmitted beam 218 lack spatial uniformity. For example, the reflective structures may be sufficiently large to block substantial portions of the incident beam 106 such that the transmitted beam 218 has corresponding gaps and the reflected beam 216 may be similarly impacted. By way of another example, the reflective structures may each diffract the incident beam 106, which may introduce additional distortions to the reflected beam 216 and the transmitted beam 218.

Referring again to FIGS. 1A through 1E, the reflective structures 124 may have any shape. For example, as illustrated in FIGS. 1C and 1D, the reflective structures 124 may be shaped as squares. However, it is to be understood that the reflective structures 124 are not limited to squares and may have any shape such as, but not limited to, circles, hexagons, or octagons.

Figure 1E:
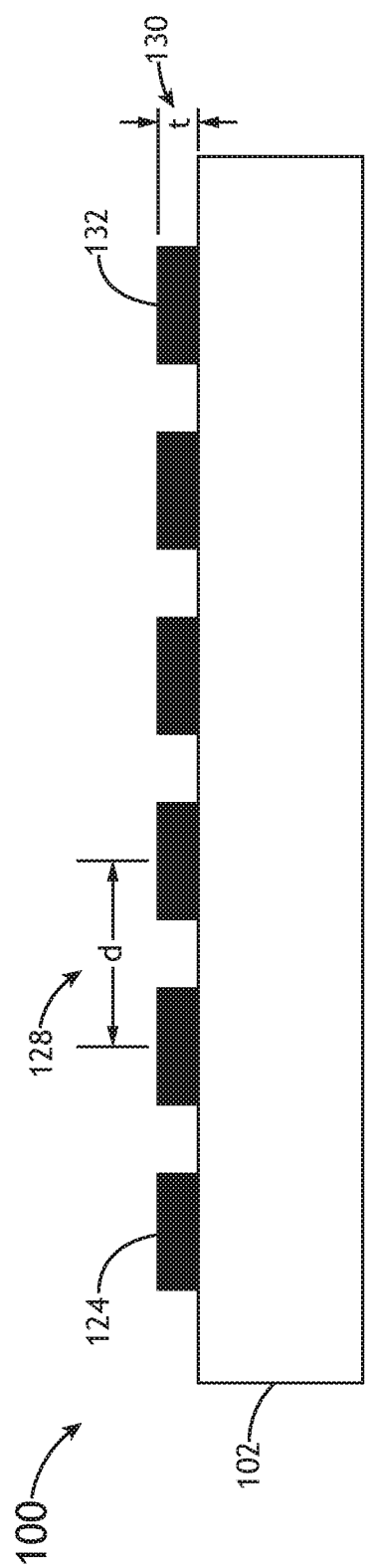
FIG. 1E is a side view of a structured surface including reflective structures formed as thin films on a substrate, in accordance with one or more embodiments of the present disclosure.

Further, the reflective structures 124 may have any thickness. FIG. 1E is a side view of a structured surface 104 including reflective structures 124 formed as thin films on a substrate 102, in accordance with one or more embodiments of the present disclosure. In one embodiment, as illustrated in FIG. 1E, the reflective structures 124 have a uniform thickness 130 (t). In another embodiment, reflective structures 124 such as, but not limited to, films as illustrated in FIG. 1E have an optically smooth top surface 132 for providing uniform reflection (e.g., specular reflection) of the incident beam 106. In another embodiment, the top surface 132 is planar.

The ratio of the reflected beam 108 to the transmitted beam 110 (e.g., the beamsplitting ratio) may be determined by the ratio of the area of the structured surface 104 covered by the reflective structures 124 to the area of the structured surface 104 not covered by the reflective structures 124 (e.g., the uncovered surface 126), subject to the reflectivity and/or absorption of the reflective structures 124. For example, the optical properties of the reflective structures 124 (e.g., reflectivity, transmissivity, absorption, or the like) may vary as a function of wavelength, thickness (e.g., thickness 130), or the like. Accordingly, any combination of the composition, the thickness 130, the size, and the distribution of the reflective structures 124 (e.g., the pitch 128) may be tailored to provide a selected beamsplitting ratio for a selected range of wavelengths of interest.

The reflective structures 124 may be formed from any material known in the art providing broadband reflectivity for the wavelengths of interest. For example, the reflective structures 124 may be formed from one or more films of metals such as, but not limited to, aluminum, gold, silver, or chrome. The reflective structures 124 may additionally be fabricated using any fabrication technique including, but not limited to, material deposition steps (e.g., deposition of a metal, a photoresist, a photomask, or the like), exposure steps, or etching steps.

Further, the nanostructured beamsplitter 100 may operate as a non-polarizing beamsplitter such that the mechanism by which the incident beam 106 is split into the reflected beam 108 and the transmitted beam 110 may not substantially depend on the polarization of the incident beam 106. Accordingly, the beamsplitting ratio may not be dependent on the polarization of the incident beam 106. For example, the transmitted beam 110, which includes the portion of the incident beam 106 is transmitted through the uncovered surface 126 of the structured surface 104 and may thus have substantially the same polarization as the incident beam 106. Similarly, the reflective structures 124 may reflect a portion of the incident beam 106 based on specular reflection on the reflective structures 124.

However, it is recognized herein that reflection and/or transmission at an interface may vary as a function of polarization based on the Fresnel equations. In this regard, portions of the incident beam 106 having electric field components oriented in the plane of incidence (e.g., p-polarized light) may have different reflection and/or transmission coefficients than those oriented normal to the plane of incidence (e.g., s-polarized light). In this regard, the polarization uniformity of the nanostructured beamsplitter 100, which may be, but is not required to be, characterized as a difference in the transmissivity or reflectivity between p-polarized light and s-polarized light (e.g., $|T_p - T_s|$ or $|R_p - R_s|$) may be non-zero. However, it is further recognized herein that the polarization uniformity of the nanostructured beamsplitter 100 may typically be better than a non-structured beamsplitter due to a relatively diminished impact of the reflective structures 124 based on the presence of uncovered surface 126 between the reflective structures 124.

Additionally, a nanostructured beamsplitter 100 may be used at any angle. For example, the ratio of the area of the reflective structures 124 to the area of the uncovered surface 126 remains the same as the structured surface 104 is rotated relative to the incident beam 106, even as the projected area of the incident beam 106 may vary. However, it is recognized herein that the reflection and/or transmission coefficients of the reflective structures 124 will typically exhibit some variation as a function of incidence angle such that the beamsplitting ratio may exhibit a corresponding variation.

In another embodiment, the nanostructured beamsplitter 100 includes an anti-reflection coating to mitigate reflections on one or more surfaces. For example, the plate nanostructured beamsplitter 100 illustrated in FIG. 1A may include an anti-reflection coating on the output face 114. By way of another example, the cubic beamsplitter illustrated in FIG. 1B may include anti-reflection coatings on any of the input face 118, the first output face 120, or the second output face 122. By way of a further example, the nanostructured beamsplitter 100 may include an anti-reflection coating on the uncovered surface 126 (e.g., portions of the structured surface 104 not covered by the reflective structures 124). In this regard, reflections (e.g., Fresnel reflections) on the uncovered surface 126 may be mitigated.

Figure 3:
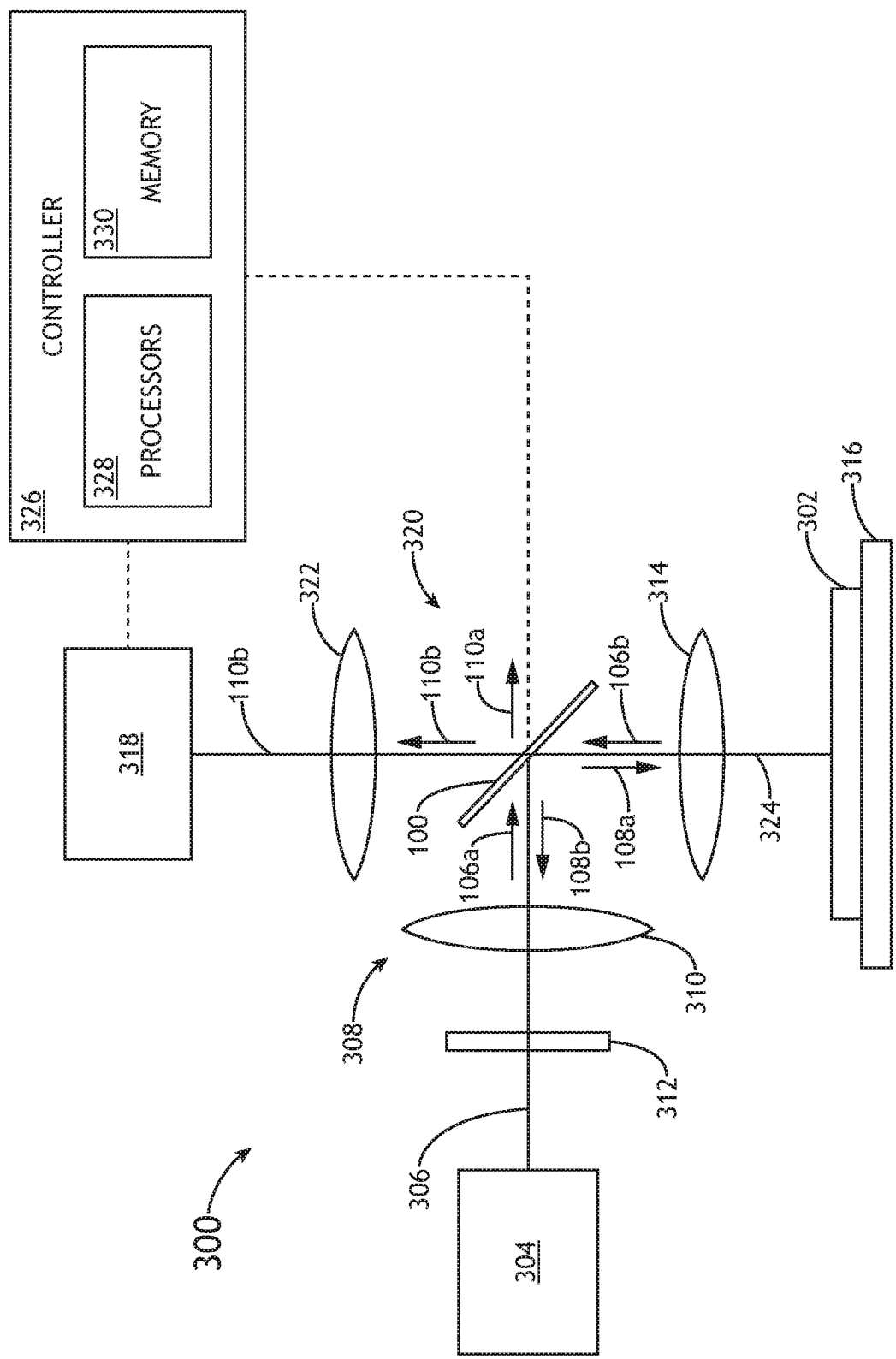
FIG. 3 is a conceptual view of an optical metrology system including a nanostructured beamsplitter, in accordance with one or more embodiments of the present disclosure.

Referring now to FIG. 3, a nanostructured beamsplitter 100 may be integrated into an optical system. FIG. 3 is a conceptual view of an optical metrology system 300 including a nanostructured beamsplitter 100, in accordance with one or more embodiments of the present disclosure.

The optical metrology system 300 may include any type of optical metrology tool known in the art suitable for generating metrology data associated with a sample 302 such as, but not limited to, an imaging metrology tool to generate an image of a portion of the sample 302, a scatterometry metrology tool to measure the diffraction and/or scattering from the sample 302, or an overlay metrology tool to measure relative positions of features on two or more layers of a sample 302. Illumination in overlay metrolology is generally described in U.S. Pat. No. 9,104,120 titled "Structured Illumination for Contrast Enhancement in Overlay Metrology" issued on Aug. 11, 2015, which is incorporated herein in its entirety.

In one embodiment, the optical metrology system 300 includes an optical illumination source 304 to generate an optical illumination beam 306. The optical illumination beam 306 may include one or more selected wavelengths of light including, but not limited to, ultraviolet (UV) light, visible light, or infrared (IR) light.

The optical illumination source 304 may include any type of illumination source suitable for providing an optical illumination beam 306. In one embodiment, the optical illumination source 304 includes a laser source. For example, the optical illumination source 304 may include, but is not limited to, one or more narrowband laser sources, a broadband laser source, a supercontinuum laser source, a white light laser source, or the like. In this regard, the optical illumination source 304 may provide an optical illumination beam 306 having high coherence (e.g., high spatial coherence and/or temporal coherence). In another embodiment, the optical illumination source 304 includes a laser-sustained plasma (LSP) source. For example, the optical illumination source 304 may include, but is not limited to, a LSP lamp, a LSP bulb, or a LSP chamber suitable for containing one or more elements that, when excited by a laser source into a plasma state, may emit broadband illumination. In another embodiment, the optical illumination source 304 includes a lamp source. For example, the optical illumination source 304 may include, but is not limited to, an arc lamp, a discharge lamp, an electrode-less lamp, or the like. In this regard, the optical illumination source 304 may provide an optical illumination beam 306 having low coherence (e.g., low spatial coherence and/or temporal coherence).

In another embodiment, the optical illumination source 304 directs the optical illumination beam 306 to a sample 302 via an illumination pathway 308. The illumination pathway 308 may include one or more illumination pathway lenses 310 or additional optical components 312 suitable for modifying and/or conditioning the optical illumination beam 306. For example, the one or more optical components 312 may include, but are not limited to, one or more polarizers, one or more filters, one or more beam splitters, one or more diffusers, one or more homogenizers, one or more apodizers, or one or more beam shapers. The illumination pathway 308 may further include an objective lens 314 configured to direct the optical illumination beam 306 to the sample 302.

In another embodiment, the sample 302 is disposed on a sample stage 316. The sample stage 316 may include any device suitable for positioning and/or scanning the sample 302 within the optical metrology system 300. For example, the sample stage 316 may include any combination of linear translation stages, rotational stages, tip/tilt stages, or the like.

In another embodiment, the optical metrology system 300 includes a detector 318 configured to capture light emanating from the sample 302 through a collection pathway 320. The collection pathway 320 may include, but is not limited to, one or more collection pathway lenses 322 for collecting light from the sample 302. For example, a detector 318 may receive light reflected or scattered (e.g., via specular reflection, diffuse reflection, and the like) from the sample 302 via one or more collection pathway lenses 322. By way of another example, a detector 318 may receive light generated by the sample 302 (e.g., luminescence associated with absorption of the optical illumination beam 306, or the like). By way of another example, a detector 318 may receive one or more diffracted orders of light from the sample 302 (e.g., 0-order diffraction, ±1 order diffraction, ±2 order diffraction, and the like).

The detector 318 may include any type of detector known in the art suitable for measuring illumination received from the sample 302. For example, a detector 318 may include, but is not limited to, a CCD detector, a TDI detector, a photomultiplier tube (PMT), an avalanche photodiode (APD), or the like. In another embodiment, a detector 318 may include a spectroscopic detector suitable for identifying wavelengths of light emanating from the sample 302.

The collection pathway 320 may further include any number of optical elements to direct and/or modify collected illumination from the sample 302 including, but not limited to, one or more collection pathway lenses 322, one or more filters, one or more polarizers, or one or more beam blocks.

In one embodiment, the detector 318 is positioned approximately normal to the surface of the sample 302. In another embodiment, the optical metrology system 300 includes a nanostructured beamsplitter 100 oriented such that the objective lens 314 may simultaneously direct the optical illumination beam 306 to the sample 302 and collect light emanating from the sample 302. Accordingly, the nanostructured beamsplitter 100 may integrate the illumination pathway 308 and the collection pathway 320 such that the illumination pathway 308 and the collection pathway 320 may share one or more additional elements (e.g., objective lens 314, apertures, filters, or the like). For example, the nanostructured beamsplitter 100 may split the optical illumination beam 306 (operating as an incident beam 106*a*) into a reflected beam 108*a* (e.g., a first illumination beam) directed to the sample and a transmitted beam 110*a* (e.g., a second illumination beam) directed out of the system. Further, the nanostructured beamsplitter 100 may split light 324 emanating from the sample 302 (operating as an additional incident beam 106b) into a reflected beam 108b (e.g., a first detected beam) directed out of the system and/or or not used and a transmitted beam 110b (e.g., a second detected beam) propagating towards the detector 318.

In another embodiment, the optical metrology system 300 includes a controller 326. In another embodiment, the controller 326 includes one or more processors 328 configured to execute program instructions maintained on a memory medium 330. In this regard, the one or more processors 328 of controller 326 may execute any of the various process steps described throughout the present disclosure. For example, the controller 326 may receive data from the detector 318 and may further generate metrology data based on the data from the detector 318. By way of another example, the controller 326 may provide the metrology data to additional components (not shown) as feed-forward or feedback data.

The controller 326 may be coupled to any components of the optical metrology system 300. In one embodiment, the controller 326 is communicatively coupled to the nanostructured beamsplitter 100 or a rotation stage (not shown) securing the nanostructured beamsplitter 100. In this regard, the controller 326 may adjust the angle of incidence of the incident beam 106 on the nanostructured beamsplitter 100.

The one or more processors 328 of a controller 326 may include any processing element known in the art. In this sense, the one or more processors 328 may include any microprocessor-type device configured to execute algorithms and/or instructions. In one embodiment, the one or more processors 328 may consist of a desktop computer, mainframe computer system, workstation, image computer, parallel processor, or any other computer system (e.g., networked computer) configured to execute a program configured to operate the optical metrology system 300, as described throughout the present disclosure. It is further recognized that the term "processor" may be broadly defined to encompass any device having one or more processing elements, which execute program instructions from a non-transitory memory medium 330. Further, the steps described throughout the present disclosure may be carried out by a single controller 326 or, alternatively, multiple controllers. Additionally, the controller 326 may include one or more controllers housed in a common housing or within multiple housings. In this way, any controller or combination of controllers may be separately packaged as a module suitable for integration into the optical metrology system 300.

The memory medium 330 may include any storage medium known in the art suitable for storing program instructions executable by the associated one or more processors 328. For example, the memory medium 330 may include a non-transitory memory medium. By way of another example, the memory medium 330 may include, but is not limited to, a read-only memory, a random access memory, a magnetic or optical memory device (e.g., disk), a magnetic tape, a solid state drive, and the like. It is further noted that memory medium 330 may be housed in a common controller housing with the one or more processors 328. In one embodiment, the memory medium 330 may be located remotely with respect to the physical location of the one or more processors 328 and controller 326. For instance, the one or more processors 328 of controller 326 may access a remote memory (e.g., server), accessible through a network (e.g., internet, intranet, and the like). Therefore, the above description should not be interpreted as a limitation on the present invention but merely an illustration.

FIG. 4 is a flow diagram illustrating steps performed in a method 400 for splitting light, in accordance with one or more embodiments of the present disclosure. Applicant notes that the embodiments and enabling technologies described previously herein in the context of the nanostructured beamsplitter 100 should be interpreted to extend to method 400. It is further noted, however, that the method 400 is not limited to the architecture of the nanostructured beamsplitter 100.

In one embodiment, the method 400 includes a step 402 of directing light having wavelengths above a selected cutoff wavelength to a substrate (e.g., substrate 102) formed from a material transparent to wavelengths of light at least above the selected cutoff wavelength, where the substrate includes reflective features (e.g., reflective structures 124) distributed across a surface of the substrate such that at least one of sizes or separation distances between structures are smaller than the cutoff wavelength. In another embodiment, separation distances (d) satisfy the condition d<<λ with respect to Eq. (1) for all wavelengths of incident light. Accordingly, the cutoff wavelength may be considered to be the smallest wavelength such that the condition d<<λ with respect to Eq. (1) is satisfied within a selected tolerance.

The reflective features may be distributed according to any pattern, provided that the condition d<<λ with respect to Eq. (1) is satisfied. For example, the reflective features may be distributed in a two-dimensional lattice pattern (e.g., a rectangular lattice pattern, a hexagonal lattice pattern, an oblique lattice pattern, an equilateral triangle lattice pattern, or the like). By way of another example, the reflective features may be distributed in a random or a pseudo-random distribution.

In another embodiment, the method 400 includes a step 404 of reflecting a portion of the incident light from the plurality of reflective features. In another embodiment, the method 400 includes a step 406 of transmitting a portion of the incident light through the surface of the substrate. In another embodiment, a splitting ratio of a power of the reflected beam to a power of the transmitted beam is based on a ratio of surface area of the reflective surfaces to an area of the incident light on the substrate. For example, provided that the condition d<<λ with respect to Eq. (1) is satisfied, Eq. (1) simplifies such that β=−α for both reflected and transmitted light. In this regard, 0-order diffraction (or specular reflection), which is wavelength-independent, effectively dominates for all wavelengths such that the divergence of the reflected light and the transmitted light are unchanged relative to the incident light. Accordingly, the beam-splitting ratio is based on the relative area of the reflective structures that reflect portions of the incident light to the area of uncovered surface (e.g., portions of the substrate between the reflective structures). Further, the small size of the reflective structures relative to the wavelength may provide spatially uniform splitting into the reflected and transmitted light.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of "couplable" include, but are not limited to, physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A metrology system comprising:
an illumination source configured to generate an illumination beam having wavelengths above a selected cutoff wavelength;
an objective lens;
a detector; and
a beamsplitter, wherein the beamsplitter splits the illumination beam into a first illumination beam and a second illumination beam, wherein the objective lens directs the first illumination beam to a sample, wherein the objective lens collects radiation emanating from the sample in response to the first illumination beam, wherein the beamsplitter splits the radiation emanating from the sample from the objective lens into a first detected beam and a second detected beam, wherein the detector receives the first detected beam, wherein the beamsplitter comprises:
a substrate formed from a material transparent to wavelengths of light at least above the selected cutoff wavelength; and
a plurality of reflective structures distributed across a surface of the substrate to form a non-polarizing beamsplitter, wherein the plurality of reflective structures are configured to split incident light having wavelengths above the selected cutoff wavelength into a reflected beam formed from portions of the incident light reflected from the plurality of reflective structures and a transmitted beam formed from portions of the incident light transmitted through the substrate, wherein separation distances between neighboring reflective structures of the plurality of reflective structures are smaller than the selected cutoff wavelength to prevent diffraction of illumination from the illumination source into non-zero diffraction orders.

2. The metrology system of claim 1, wherein the plurality of reflective structures comprises:
metallic films on the surface of the substrate.

3. The metrology system of claim 1, wherein the plurality of reflective structures includes planar surfaces parallel to the surface of the substrate.

4. The metrology system of claim 1, wherein the plurality of reflective structures is distributed in a square lattice pattern having a common pitch in a first direction and a second direction perpendicular to the first direction.

5. The metrology system of claim 1, wherein the plurality of reflective structures is distributed in at least one of a hexagonal lattice pattern, an oblique lattice pattern, or an equilateral triangle lattice pattern.

6. The metrology system of claim 1, wherein the substrate comprises:
at least one of fused silica, Suprasil, Heralux, $CaF_2$, $MgF_2$, LiF, quartz, or sapphire.

7. The metrology system of claim 1, wherein the selected cutoff wavelength comprises:
a wavelength in the range of approximately 120 nm to approximately 200 nm.

8. The metrology system of claim 1, wherein the selected cutoff wavelength comprises:
at least one of an ultraviolet wavelength, a deep ultraviolet wavelength, a vacuum ultraviolet wavelength, or an extreme ultraviolet wavelength.

9. The metrology system of claim 1, wherein the sizes of the plurality of reflective structures are less than 1 micrometer.

10. The metrology system of claim 1, wherein the separation distances between neighboring reflective structures are less than 1 micrometer.

11. The metrology system of claim 1, wherein the substrate and the plurality of reflective structures are configured as a plate beamsplitter.

12. The metrology system of claim 1, further comprising:
an additional substrate disposed on the plurality of reflective structures, wherein the second substrate is transparent to wavelengths at least above the selected cutoff wavelength.

13. The metrology system of claim 12, wherein the substrate, the plurality of reflective structures, and the additional substrate are configured as a cubic beamsplitter.

14. The metrology system of claim 1, wherein the surface of the substrate is a planar surface.

15. The metrology system of claim 1, wherein the surface of the substrate is a curved surface.

16. The metrology system of claim 15, wherein the curved surface provides a selected focal power.

17. A method for splitting light comprising:
generating illumination having wavelengths above a selected cutoff wavelength;
directing the illumination to a non-polarizing beamsplitter, wherein the beamsplitter comprises:
a substrate formed from a material transparent to wavelengths of light at least above the selected cutoff wavelength; and
a plurality of reflective structures distributed across a surface of the substrate to form a non-polarizing beamsplitter, wherein the plurality of reflective structures are configured to split incident light having wavelengths above the selected cutoff wavelength into a reflected beam formed from portions of the incident light reflected from the plurality of reflective structures and a transmitted beam formed from portions of the incident light transmitted through the substrate, wherein separation distances between neighboring reflective structures of the plurality of reflective structures are smaller than the selected cutoff wavelength to prevent diffraction of light above the cutoff wavelength into non-zero diffraction orders;
splitting, with the beamsplitter, the illumination into a first illumination beam and a second illumination beam;
directing, with an objective lens, the first illumination beam to a sample;

collecting, with the objective lens, radiation emanating from the sample in response to the first illumination beam;

splitting, with the beamsplitter, the radiation emanating from the sample from the objective lens into a first detected beam and a second detected beam; and receiving the first detected beam with a detector.

18. The method of claim 17, wherein the substrate and the plurality of reflective structures are configured as a plate beamsplitter.

19. The method of claim 17, further comprising:

an additional substrate disposed on the plurality of reflective structures, wherein the additional substrate is transparent to wavelengths at least above the selected cutoff wavelength.

20. The method of claim 19, wherein the substrate, the plurality of reflective structures, and the additional substrate are configured as a cubic beamsplitter.

* * * * *